(12) United States Patent
Shin et al.

(10) Patent No.: US 9,432,106 B2
(45) Date of Patent: Aug. 30, 2016

(54) COMMUNICATION METHOD IN RELAY NODES AND DESTINATION NODES FOR ALIGNED INTERFERENCE NEUTRALIZATION IN INTERFERENCE CHANNEL

(75) Inventors: Won Jae Shin, Geoje-si (KR); Chang Yong Shin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 382 days.

(21) Appl. No.: 13/550,698

(22) Filed: Jul. 17, 2012

(65) Prior Publication Data

US 2013/0142105 A1 Jun. 6, 2013

(30) Foreign Application Priority Data

Dec. 2, 2011 (KR) .................. 10-2011-0128450

(51) Int. Cl.
*H04B 7/155* (2006.01)
*H04B 7/06* (2006.01)

(52) U.S. Cl.
CPC ........... *H04B 7/1555* (2013.01); *H04B 7/0617* (2013.01); *H04B 7/0639* (2013.01)

(58) Field of Classification Search
CPC ......... H04B 15/00; H04B 7/14; H04B 1/62; H04B 7/0434; H04B 7/0617; H04B 7/086; H04B 7/0456; H04B 10/532; H04B 10/6166; H04B 7/0639; H04B 7/1555; G06T 15/04
See application file for complete search history.

(56) References Cited

U.S. PATENT DOCUMENTS

| | | | |
|---|---|---|---|
| 2004/0209579 A1* | 10/2004 | Vaidyanathan | 455/101 |
| 2008/0080634 A1* | 4/2008 | Kotecha et al. | 375/267 |
| 2009/0047901 A1* | 2/2009 | Yu et al. | 455/7 |
| 2009/0103428 A1* | 4/2009 | Kim et al. | 370/210 |
| 2009/0227202 A1* | 9/2009 | Doppler et al. | 455/11.1 |
| 2009/0286546 A1 | 11/2009 | Hwang et al. | |
| 2009/0313528 A1* | 12/2009 | Chugg et al. | 714/758 |
| 2010/0265813 A1* | 10/2010 | Pereira et al. | 370/201 |
| 2011/0051837 A1* | 3/2011 | Park et al. | 375/285 |
| 2012/0046038 A1* | 2/2012 | Gao et al. | 455/447 |
| 2012/0281778 A1* | 11/2012 | Ruan et al. | 375/267 |
| 2012/0289267 A1* | 11/2012 | Seo | H04B 7/0417 455/501 |

FOREIGN PATENT DOCUMENTS

| | | |
|---|---|---|
| KR | 10-2010-0064191 A | 6/2010 |
| KR | 10-2011-0049035 A | 5/2011 |
| KR | 10-2011-0065036 A | 6/2011 |

* cited by examiner

*Primary Examiner* — Andrew Lai
*Assistant Examiner* — M Mostazir Rahman
(74) *Attorney, Agent, or Firm* — NSIP Law

(57) ABSTRACT

A communication method in relay nodes and destination nodes for neutralization of aligned interferences in an interference channel is provided. A communication method of a first relay node in a network including a first source node, the first relay node, a first destination node, a second source node, a second relay node, and a second destination node, includes receiving, from the first source node, streams X and Y. The communication method further includes receiving, from the second source node, a stream Z. The communication method further includes generating a signal in which the streams Y and Z are aligned in a space. The communication method further includes transmitting, to the first destination node and the second destination node, the stream X and the signal.

19 Claims, 11 Drawing Sheets

PHASE 1) INTERFERENCE ALIGNMENT

PHASE 2) ALIGNED INTERFERENCE NEUTRALIZATION (DISTRIBUTED ZERO-FORCING)

FIG. 3
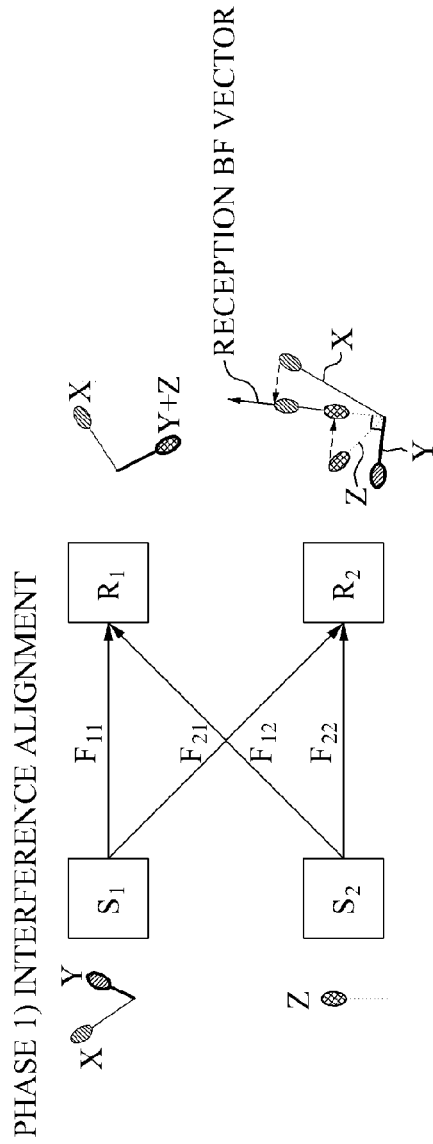
PHASE 1) INTERFERENCE ALIGNMENT
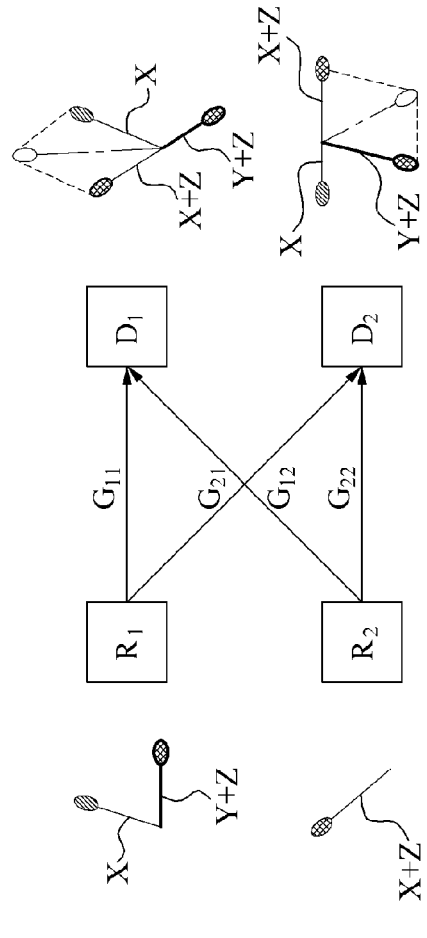
PHASE 2) ALIGNED INTERFERENCE NEUTRALIZATION (DISTRIBUTED ZERO-FORCING)

FIG. 4

<CODEBOOK - INDICATING ALIGNED SPACE>

| INDEX | 1 | 2 | 3 | 4 | 5 | 6 |
|---|---|---|---|---|---|---|
| ALIGNED SPACE (g) | $\begin{bmatrix} 1/\sqrt{2} \\ 1/\sqrt{2} \end{bmatrix}$ | $\begin{bmatrix} 1/\sqrt{2} \\ -1/\sqrt{2} \end{bmatrix}$ | $\begin{bmatrix} -1/\sqrt{2} \\ 1/\sqrt{2} \end{bmatrix}$ | $\begin{bmatrix} -1/\sqrt{2} \\ -1/\sqrt{2} \end{bmatrix}$ | $\begin{bmatrix} 0 \\ 1 \end{bmatrix}$ | $\begin{bmatrix} 1 \\ 0 \end{bmatrix}$ |

COMMUNICATION METHOD IN RELAY NODES AND DESTINATION NODES FOR ALIGNED INTERFERENCE NEUTRALIZATION IN INTERFERENCE CHANNEL

CROSS-REFERENCE TO RELATED APPLICATION(S)

This application claims the benefit under 35 U.S.C. §119 (a) of Korean Patent Application No. 10-2011-0128450, filed on Dec. 2, 2011, in the Korean Intellectual Property Office, the entire disclosure of which is incorporated herein by reference for all purposes.

BACKGROUND

1. Field

The following description relates to a communication method in relay nodes and destination nodes for neutralization of aligned interferences in an interference channel.

2. Description of Related Art

Communication systems are used to connect people. Communication devices are connected to each other via a network. Due to the development of communication technologies, and the unification devices, smartphones, sensors, and/or other devices with a communication function, such communication devices have formed larger networks. In addition, users of communication devices may more easily utilize various applications via a direct connection between the communication devices. The various applications may include, for example, content sharing, synchronization, printing, gaming, and/or other types of applications.

To respond to these changes in communication systems, there is a need for wireless communication technologies to support a direct connection between communication devices, namely, a device-to-device communication, as well as a cellular communication using an existing infrastructure. However, when transmission nodes and reception nodes simultaneously transmit signals via the wireless communication technologies, performance may be degraded since the signals may act as interferences between the transmission nodes and the reception nodes.

SUMMARY

In one general aspect, there is provided a communication method of a first relay node in a network comprising a first source node, the first relay node, a first destination node, a second source node, a second relay node, and a second destination node, the communication method including receiving, from the first source node, streams X and Y. The communication method further includes receiving, from the second source node, a stream Z. The communication method further includes generating a signal in which the streams Y and Z are aligned in a space. The communication method further includes transmitting, to the first destination node and the second destination node, the stream X and the signal.

The generating of the signal may include generating the signal based on an indicator indicating the space, the indicator being in a predetermined codebook.

The communication method may further include determining a transmission beamforming (BF) vector of the first source node based on a vector indicating the space, the transmission BF vector being used to transmit the stream Y.

The communication method may further include determining a transmission BF vector of the second source node based on a vector indicating the space, the transmission BF vector being used to transmit the stream Z.

A non-transitory computer-readable storage medium may store program instructions controlling a processor to perform the method.

In another general aspect, there is provided a communication method of a second relay node in a network comprising a first source node, a first relay node, a first destination node, a second source node, the second relay node, and a second destination node, the communication method comprising determining a reception beamforming (BF) vector so that a stream Z to be received from the second source node and a stream X to be received from the first source node are aligned in a predetermined space. The communication method further includes receiving, from the second source node and the first source node, the streams Z and X, respectively. The communication method further includes generating a signal in which the streams Z and X are aligned in the space based on the reception BF vector. The communication method further includes transmitting, to the first destination node and the second destination node, the signal.

The determining of the reception BF vector may include determining the reception BF vector to be orthogonal to a channel direction in which a stream Y is to be received from the first source node so that the streams Z and X are aligned in a same direction as the reception BF vector.

The communication method may further include receiving, from the first source node, another signal comprising the stream X and the stream Y. The communication method may further include generating the signal based on the other signal, the stream Z, and the reception BF vector to remove the stream Y from the other signal.

In still another general aspect, there is provided a communication method of a first destination node in a network comprising a first source node, a first relay node, the first destination node, a second source node, a second relay node, and a second destination node, the communication method comprising receiving, from the first relay node, a stream X and a first signal in which streams Y and Z are aligned. The communication method further includes receiving, from the second relay node, a second signal in which the streams X and Z are aligned. The communication method further includes removing the stream X to neutralize an interference.

A direction of a transmission beamforming (BF) vector used to transmit the first signal may be opposite to a direction of another transmission BF vector used to transmit the second signal.

The removing may include adjusting a size of each of the first signal and the second signal based on a signal strength ratio of streams included in each of the first signal and the second signal to neutralize the interference.

The communication method may further include determining a feedback indicator based on information associated with a communication environment, the feedback indicator indicating which one of the first destination node and the second destination node provides, as a feedback to the first relay node, information on a transmission BF vector.

The information associated with the communication environment may include a communication topology, or a channel communication status, or a fairness for each user, or any combination thereof.

The communication method may further include providing, as the feedback to the first relay node, information on a first transmission BF vector based on the feedback indicator, the first transmission BF vector being used by the first relay node to transmit the stream X.

The communication method may further include providing, as the feedback to the first relay node, information on a second transmission BF vector based on the feedback indicator, the second transmission BF vector being used by the first relay node to transmit the first signal.

In yet another general aspect, there is provided a communication method of a second destination node in a network comprising a first source node, a first relay node, a first destination node, a second source node, a second relay node, and the second destination node, the communication method including receiving, from the first relay node, a stream X and a first signal in which streams Y and Z are aligned. The communication method further includes receiving, from the second relay node, a second signal in which the streams X and Z are aligned. The communication method further includes removing the first signal to neutralize an interference.

The removing may include adjusting a size of each of the stream X and the second signal based on a signal strength ratio of streams included in each of the stream X and the second signal to neutralize the interference.

The communication method may further include determining a feedback indicator based on information associated with a communication environment, the feedback indicator indicating which one of the first destination node and the second destination node provides, as a feedback to the first relay node, information on a transmission beamforming (BF) vector.

The communication method may further include providing, as the feedback to the first relay node, information on a first transmission BF vector based on the feedback indicator, the first transmission BF vector being used by the first relay node to transmit the stream X.

The communication method may further include providing, as the feedback to the first relay node, information on a second transmission BF vector based on the feedback indicator, the second transmission BF vector being used by the first relay node to transmit the first signal.

Other features and aspects will be apparent from the following detailed description, the drawings, and the claims.

BRIEF DESCRIPTION OF THE DRAWINGS

FIG. 3 is a diagram illustrating an example of a communication method in relay nodes and destination nodes for neutralization of aligned interferences in an interference channel.

FIG. 4 is a diagram illustrating an example of a codebook used in a communication method in relay nodes and destination nodes for neutralization of aligned interferences in an interference channel.

Figure 1:
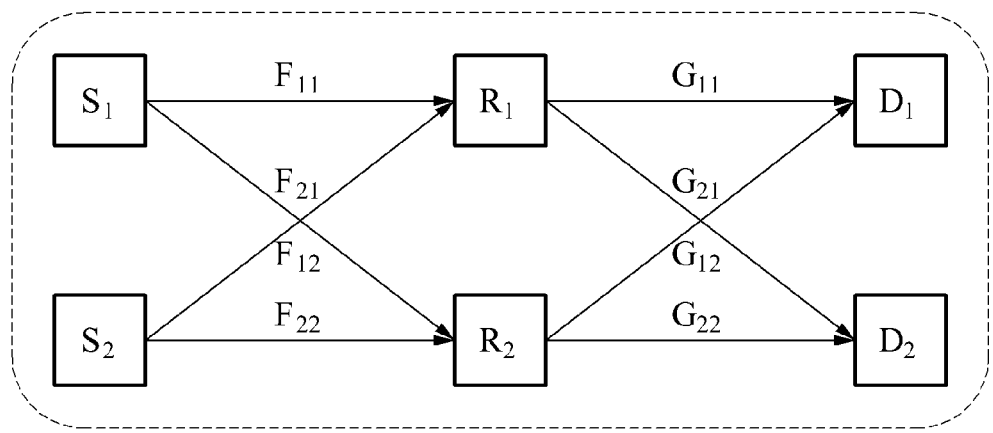
FIG. 1 is a diagram illustrating an example of a 2×2×2 interference network.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, description of well-known functions and constructions may be omitted for increased clarity and conciseness.

FIG. 1 illustrates an example of a 2×2×2 interference network. The 2×2×2 interference network includes a first source node $S_1$, a second source node $S_2$, a first relay node $R_1$, a second relay node $R_2$, a first destination node $D_1$, and a second destination node $D_2$.

In a transmission scheme (e.g., a single-hop transmission scheme) of the 2×2×2 interference network, $F_{11}$ refers to a channel via which the first source node $S_1$ transmits a stream to the first relay node $R_1$, and $F_{21}$ refers to a channel via which the first source node $S_1$ transmits a stream to the second relay node $R_2$. $F_{12}$ refers to a channel via which the second source node $S_2$ transmits a stream to the first relay node $R_1$, and $F_{22}$ refers to a channel via which the second source node $S_2$ transmits a stream to the second relay node $R_2$.

Additionally, $G_{11}$ refers to a channel via which the first relay node $R_1$ transmits a stream to the first destination node $D_1$, and $G_{21}$ refers to a channel via which the first relay node $R_1$ transmits a stream to the second destination node $D_2$. $G_{12}$ refers to a channel via which the second relay node $R_2$ transmits a stream to the first destination node $D_1$, and $G_{22}$ refers to a channel via which the second relay node $R_2$ transmits a stream to the second destination node $D_2$. However, the transmission scheme described above is not limited to the 2×2×2 interference network, and may be extended to other networks, such as a multi-hop network.

Figure 2:
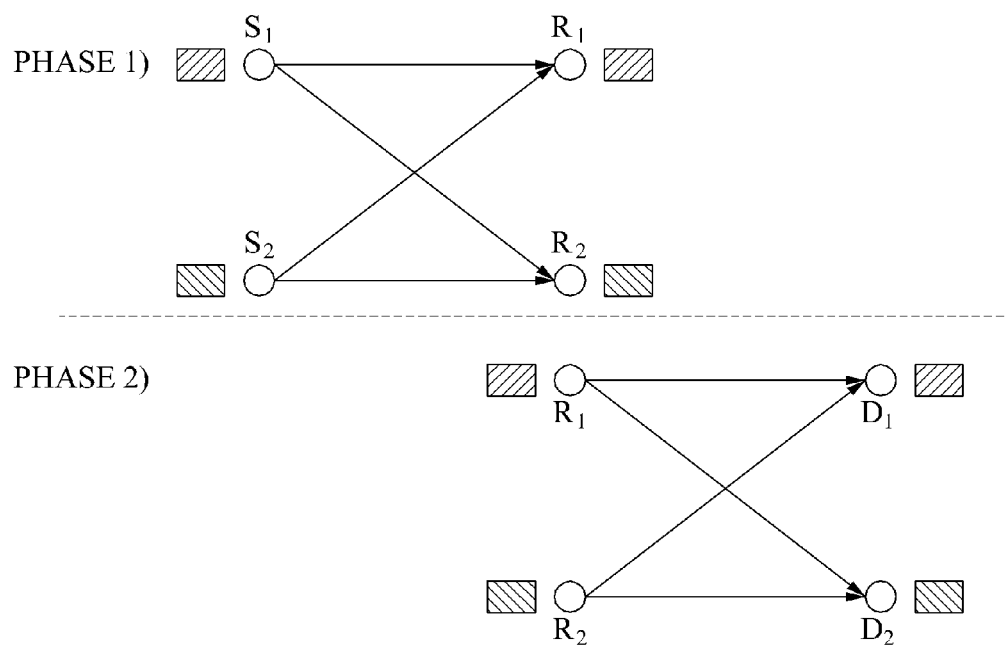
FIG. 2 is a diagram illustrating an example of an extension of a single-hop transmission scheme.

FIG. 2 illustrates an example of an extension of a single-hop transmission scheme. In the example of FIG. 2, the 2×2×2 interference network of FIG. 1 is converted into two 2×2 interference networks to form a multi-hop network, and transmission (e.g., a multi-hop transmission scheme) is performed. Two antennas are included in each of the first source node $S_1$, the second source node $S_2$, the first relay node $R_1$, the second relay node $R_2$, the first destination node $D_1$, and the second destination node $D_2$.

For example, to form a 2-hop network, the 2×2×2 interference network is divided into two phases 1 and 2. A total of two streams is transmitted in the 2-hop network. This is because each user transmits a single stream when each of the two phases is identical to a 2-user Multiple-Input and Multiple-Output (MIMO) interference channel. A number of streams to be transmitted remains unchanged, even when the 2-user MIMO interference channel is continued twice. Hereinafter, the term "stream" may refer to a "data stream".

FIG. 3 illustrates an example of a communication method in relay nodes and destination nodes for neutralization of aligned interferences in an interference channel. The communication method may be performed using the transmission scheme based on the two phases as illustrated in FIG. 2. However, a first relay node $R_1$ and a second relay node $R_2$ of FIG. 3 performs different functions than the first relay node $R_1$ and second relay node $R_2$ of FIG. 2.

In more detail, in the example of FIG. 2, the first relay node $R_1$ detects only a signal received from the first source node $S_1$, and determines, as an interference, a signal received from the second source node $S_2$. Additionally, the second relay node $R_2$ detects only a signal received from the second source node $S_2$, and determines, as an interference, a signal received from the first source node $S_1$.

However, in the multi-hop transmission scheme, the first source node $S_1$ may have to transmit the signal of the first source node $S_1$ to the first destination node $D_1$, and the second source node $S_2$ may have to transmit the signal of the second source node $S_2$ to the second destination node $D_2$. The first relay node $R_1$ and the second relay node $R_2$ are respectively located between the first source node $S_1$ and the first destination node $D_1$, and between the second source node $S_2$ and the second destination node $D_2$. Additionally, the first relay node $R_1$ and the second relay node $R_2$ may be used by both the first source node $S_1$ and the second source node $S_2$, even though the first relay node $R_1$ and the second relay node $R_2$ detect only the signal received from the the first source node $S_1$ and the second source node $S_2$, respectively. In other words, it may be difficult for a source node to efficiently transmit a signal to a corresponding destination node via a relay node.

To more efficiently transmit the signal to the corresponding destination node, in the example of FIG. 3, a first source node $S_1$ transmits two streams, for example, streams X and Y, to a first destination node $D_1$, and a second source node $S_2$ transmits a single stream, for example, a stream Z, to a second destination node $D_2$. This transmission scheme achieves significantly higher performance than the transmitting of the two streams as illustrated in FIG. 2.

In more detail, in a phase 1 of the transmission scheme of FIG. 3, to transmit streams to the first relay node $R_1$ and second relay node $R_2$, one of conditions of a transmitter (e.g., the first source node $S_1$ and/or the second source node $S_2$) indicates that the stream Y and the stream Z are enabled to be aligned in the first relay node $R_1$. The streams Y and Z are aligned in an aligned space, instead of being aligned in an arbitrary direction. The aligned space is determined in advance, and known to both the first source node $S_1$ and the second source node $S_2$. For example, when both the first source node $S_1$ and the second source node $S_2$ know the aligned space, channel feedback is cancelled using channel reciprocity, namely. a characteristic of Time-Division Duplexing (TDD).

The above condition may be represented as shown in the following Equation 1:

$$g = \lambda_1 F_{11} V_2 = \lambda_2 F_{12} V_3 \quad \text{[Equation 1]}$$

In Equation 1, $V_i$ denotes a transmission beamforming (BF) vector used by a source node to transmit a stream $s_i$. In this example, i may be a natural number of 1 to 3. Additionally, $\lambda$ denotes a predetermined constant, and g denotes a vector indicating a space in which streams transmitted by source nodes are to be aligned.

The vector g is used to set, in advance, the space in which the streams transmitted by the source nodes are to be aligned during communication initialization. For example, the vector g may be determined based on an indicator or a user identifier (ID) that is assigned to each source node when the source nodes share a codebook illustrated in FIG. 4.

Based on Equation 1, a transmission BF vector $V_2$ for the stream Y, and a transmission BF vector $V_3$ for the stream Z may be respectively determined based on the following Equations 2 and 3:

$$V_2 = \alpha_1 F_{11}^{-1} g \quad \text{[Equation 2]}$$

$$V_3 = \alpha_2 F_{12}^{-1} g \quad \text{[Equation 3]}$$

In Equations 2 and 3, $\alpha_1$ and $\alpha_2$ denote constants used to adjust unit power constraints of the transmission BF vectors $V_2$ and $V_3$.

In an example of the TDD, each of the channels $F_{11}$ and $F_{12}$ may be estimated based on an uplink Sounding Reference Signal (SRS) of each of the first source node $S_1$ and the second source node $S_2$. Accordingly, the transmission BF vectors $V_2$ and $V_3$ may be determined even when information on channels is not provided as feedback.

The second relay node $R_2$ includes two antennas as described above, and receives three signals (e.g., the respective streams X, Y, and Z) from the first source node $S_1$ and second source node $S_2$ via the two antennas. However, in a phase 2 of the transmission scheme of FIG. 3, the second relay node $R_2$ requires only a signal 'X+Z' in which the streams X and Z are aligned, among the received signals. Accordingly, a receiver, namely, a relay node, directly aligns signals, instead of a transmitter, namely, a source node, aligning signals through channel feedback.

Since only a signal in which streams X, Y and Z are mixed (e.g., combined) is restored in the second relay node $R_2$, it may be difficult to restore a desired signal (e.g., the signal 'X+Z') using a MIMO detection method. Accordingly, a receiver, namely, a relay node, aligns interferences.

Since the stream Y is not required by the second relay node $R_2$, the second relay node $R_2$ receives only a signal in which signal components other than a signal component corresponding to the stream Y are mixed. For example, a direction of a reception BF vector of the second relay node $R_2$ is determined or set to be orthogonal to a channel direction in which the second relay node $R_2$ receives the stream Y, to remove the stream Y from a signal received from the first source node. In this example, the second relay node $R_2$ receives the signal 'X+Z' in which the streams X and Z are aligned corresponding to an amount of the streams X and Z projected in the same direction as the reception BF vector. Additionally, since the signal component corresponding to the stream Y is completely removed from the signal 'X+Z', the second relay node $R_2$ receives the desired signal.

A reception BF vector $W_3$ of the second relay node $R_2$ may be represented as shown in the following Equation 4:

$$W_3 = (F_{21} V_2)^{\perp} \quad \text{[Equation 4]}$$

Hereinafter, an example of a method of transmitting signals received by relay nodes via the phase 1, to destination nodes via the phase 2, will be described. In the phase 2, streams are transmitted from the relay nodes to the destination nodes. For example, the first destination node $D_1$ receives the streams X and Y, and the second destination node $D_2$ receives a stream Z, through interference neutralization.

In more detail, $V_1^R$ refers to a transmission BF vector used by the first relay node $R_1$ to transmit the stream X, and $V_2^R$ may refers to a transmission BF vector used by the first relay node $R_1$ to transmit a signal 'Y+Z' in which the streams Y and Z are aligned. Additionally, $V_3^R$ refers a transmission BF vector used by the second relay node $R_2$ to transmit the signal 'X+Z' in which streams X and Z are aligned.

In the first destination node $D_1$, the transmission BF vectors $V_2^R$ and $V_3^R$ are received in opposite directions. Additionally, a signal component corresponding to the stream X received by the first destination node $D_1$ is completely removed, by adjusting a size of each of the signals 'X+Z' and 'Y+Z' in the phase 1 based on a signal strength ratio of the streams included in each of the signals 'X+Z' and 'Y+Z', which is called "interference neutralization".

A condition for the interference neutralization may be represented as shown in the following Equation 5:

$$G_{11}v_2^R = -\alpha G_{12}v_3^R \qquad \text{[Equation 5]}$$

In Equation 5, $\alpha$ denotes a scaling factor used to completely remove a signal component corresponding to the stream X in the first destination node $D_1$. The scaling factor $\alpha$ may depend on channels and BF parameters in alignment in the phase 1.

Similarly to the phase 1, the interference neutralization is also performed in an aligned space g determined in advance. For example, when the interference neutralization is performed in the aligned space g, the first destination node $D_1$ determines the transmission BF vectors $v_2^R$ and $v_3^R$ satisfying Equation 5 based on an uplink SRS without a separate channel feedback.

A condition for interference neutralization in the second destination node $D_2$ may be represented as shown in the following Equation 6:

$$G_{22}V_3^R = \lambda_3^R G_{21}V_1^R \qquad \text{[Equation 6]}$$

That is, the second destination node $D_2$ neutralizes an interference by removing a signal component corresponding to the signal 'Y+Z' in which the streams Y and Z are aligned. This is performed by adjusting a size of each of the stream X and the signal 'X+Z' in the phase 1 based on a signal strength ratio of the streams included in each of the stream X and the signal 'X+Z'.

The transmission BF vector $V_1^R$ may be determined from Equation 6, using the following Equation 7:

$$V_1^R = \alpha_3 G_{21}^{-1} G_{22} V_3^R \qquad \text{[Equation 7]}$$

In Equation 7, a value of $G_{21}^{-1} G_{22}$ is known to only the second destination node $D_2$. Additionally, the second destination node $D_2$ knows the transmission BF vector $V_3^R$ using an SRS, and as a result, a transmission BF vector $V_1^R$ may be determined.

The obtained transmission BF vector $V_1^R$ is used by the first relay node $R_1$ to transmit the X stream. The second destination node $D_2$ may provide, as feedback to the first relay node $R_1$, information on the transmission BF vector $V_1^R$. This feedback may be provided to determine a transmission BF vector for a relay node (for example, the first relay node $R_1$) corresponding to the second destination node $D_2$, and may be referred to as an "altruistic feedback". An example of a method of performing the altruistic feedback in the second destination node $D_2$ will be described later with reference to FIG. 10.

In a 2×2×2 interference network, the second destination node $D_2$ may provide, as feedback to the first relay node $R_1$, all Channel State Information (CSI), such as $G_{21}^{-1}$, $G_{22}$, and any other channels. However, it is possible to achieve the same effect as providing the CSI by providing, as feedback to the first relay node $R_1$, only the information on the transmission BF vector $V_1^R$.

In addition, the first destination node $D_1$ may perform an egoistic feedback, namely, a feedback from only the first destination node $D_1$, unlike the above-described altruistic feedback. The egoistic feedback refers to a scheme in which the first destination node $D_1$ provides, as feedback to the first relay node $R_1$, information on the transmission BF vector $v_2^R$. To perform the egoistic feedback, the first destination node $D_1$ uses information acquired by the first destination node $D_1$ using an SRS and/or any other signals known to one of ordinary skilled in the art, when the second destination node $D_2$ defines an aligned vector space and determines the transmission BF vectors $v_1^R$ and $v_3^R$ without a feedback. An example of a method of performing the egoistic feedback in the first destination node $D_1$ will be described below with reference to FIG. 11.

Due to low cooperation overheads in both the above-described altruistic feedback and egoistic feedback, it is possible to perform the interference neutralization in both the first destination node $D_1$ and second destination node $D_2$. Accordingly, a feedback mode may be selected to determine which one of the first destination node $D_1$ and second destination node $D_2$ provides, as feedback to the first relay node, information on the transmission BF vector $v_1^R$ or $v_2^R$, respectively, based on information associated with a communication environment. Based on the selected feedback mode, a feedback indicator indicating which destination node provides, as feedback to the first relay node, the information on the transmission BF vector, may be determined The information associated with the communication environment may include, for example, a communication topology, a channel communication status including an uplink and a downlink, a fairness for each user, and/or any other information associated with the communication environment known to one of ordinary skill in the art. An example of a method of determining a feedback mode will be described below with reference to FIG. 9. The determining of the feedback mode and/or the feedback indicator may be performed by the the first destination node $D_1$ and second destination node $D_2$.

FIG. 4 illustrates an example of a codebook used in a communication method in relay nodes and destination nodes for neutralization of aligned interferences in an interference channel. The codebook indicates an aligned space g determined in advance, and known to both the first source node $S_1$ and the second source node $S_2$, as described above in the the phase 1 of the transmission scheme of FIG. 3. For example, when both the first source node $S_1$ and the second source node $S_2$ know the aligned space g in which streams are to be aligned, channel feedback is cancelled using channel reciprocity, namely, a characteristic of TDD.

Similarly to the phase 1, interference neutralization in the phase 2 of the transmission scheme of FIG. 3, may also be performed in the aligned space g. For example, when the interference neutralization is performed in the aligned space g, the first destination node $D_1$ may obtain transmission BF vectors of the first relay node $R_1$ and second relay node $R_2$ based on an uplink SRS, without a separate channel feedback.

As described above, the streams are aligned based on the aligned space in the predetermined codebook. When the aligned space is indicated by an indicator, for example, a user index and/or any other indicators known to one of ordinary skill in the art, in the predetermined codebook, the aligned space includes a spatial reusability. Accordingly, different neighboring interference networks are spaced apart by a predetermined distance from an indicator indicating an aligned space.

Figure 5:
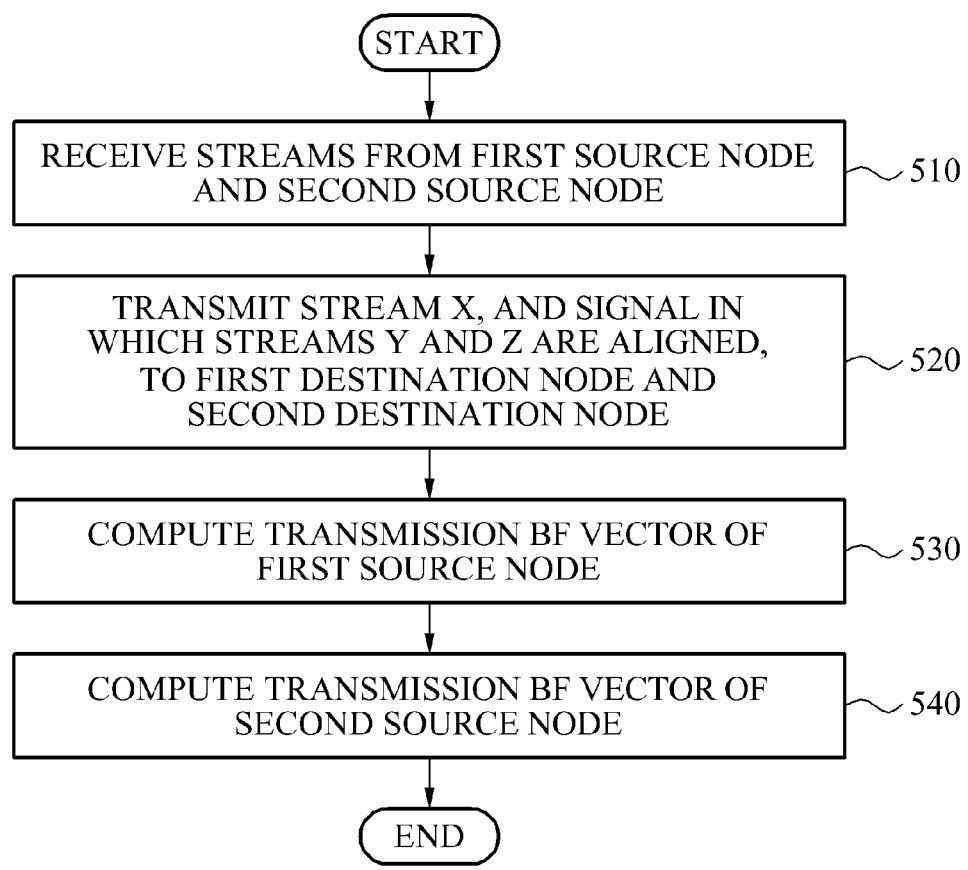
FIG. 5 is a flowchart illustrating an example of a communication method in a first relay node.

FIG. 5 illustrates an example of a communication method in a first relay node in a network including a first source node, the first relay node, a first destination node, a second source node, a second relay node, and a second destination node. In operation 510, the first relay node receives streams from the first source node and the second source node. The streams received by the first relay node includes streams X and Y transmitted by the first source node, and a stream Z transmitted by the second source node. Additionally, the streams Y and Z are aligned in a predetermined space.

For example, the streams Y and Z are aligned in the same space based on an indicator (for example, an aligned space indicator) indicating the space in which streams are to be aligned, from a predetermined codebook. The predetermined codebook may be shared by the source nodes and the relay nodes. Since the aligned space is known in advance in a TDD environment, blind interference alignment is enabled using channel reciprocity, without a channel exchange.

In operation 520, the first relay node transmits the steam X, and a signal in which the streams Y and Z are aligned, to the first destination node and the second destination node. In operation 530, the first relay node computes a transmission BF vector of the first source node based on a vector indicating the same space. The transmission BF vector of the first source node is used to transmit the stream Y.

In operation 540, the first relay node computes a transmission BF vector of the second source node based on the vector indicating the same space. The transmission BF vector of the second source node is used to transmit the stream Z.

Operations 530 and 540 are only examples and not limited to the order of the example of FIG. 5. Accordingly, operations 530 and 540 may be simultaneously performed, or operation 540 may be performed prior to operation 530.

Figure 6:
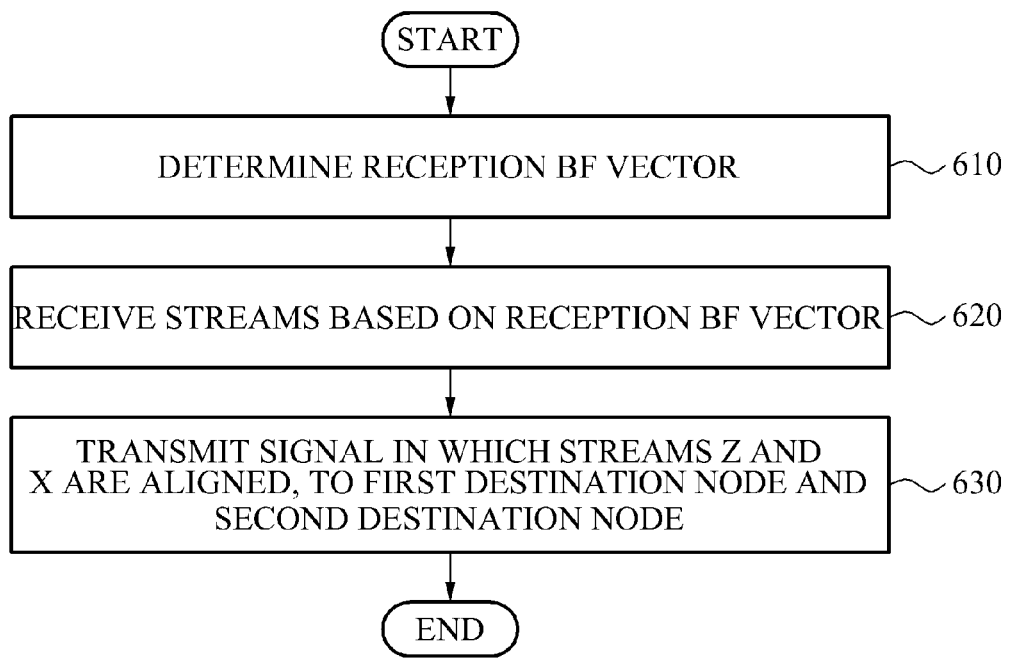
FIG. 6 is a flowchart illustrating an example of a communication method in a second relay node.

FIG. 6 illustrates an example of a communication method in a second relay node in a network including a first source node, a first relay node, a first destination node, a second source node, the second relay node, and a second destination node. The communication method adjusts streams received at the second relay node to enable signals to be aligned in a predetermined space.

In operation 610, the second relay node determines a reception BF vector so that a stream Z transmitted by the second source node and a stream X transmitted by the first source node are aligned in a predetermined space. That is, the reception BF vector is determined to be orthogonal to a channel direction in which a stream Y is received from the first source node, to remove the stream Y from a signal received from the first source node, and to align the streams Z and X in the same direction as the reception BF vector.

In operation 620, the second relay node receives the streams from the first source node and the second source node based on the reception BF vector to generate a signal in which the streams Z and X, among the received streams, are aligned. In operation 630, the second relay node transmits the signal in which the streams Z and X are aligned, to the first destination node and the second destination node.

Figure 7:
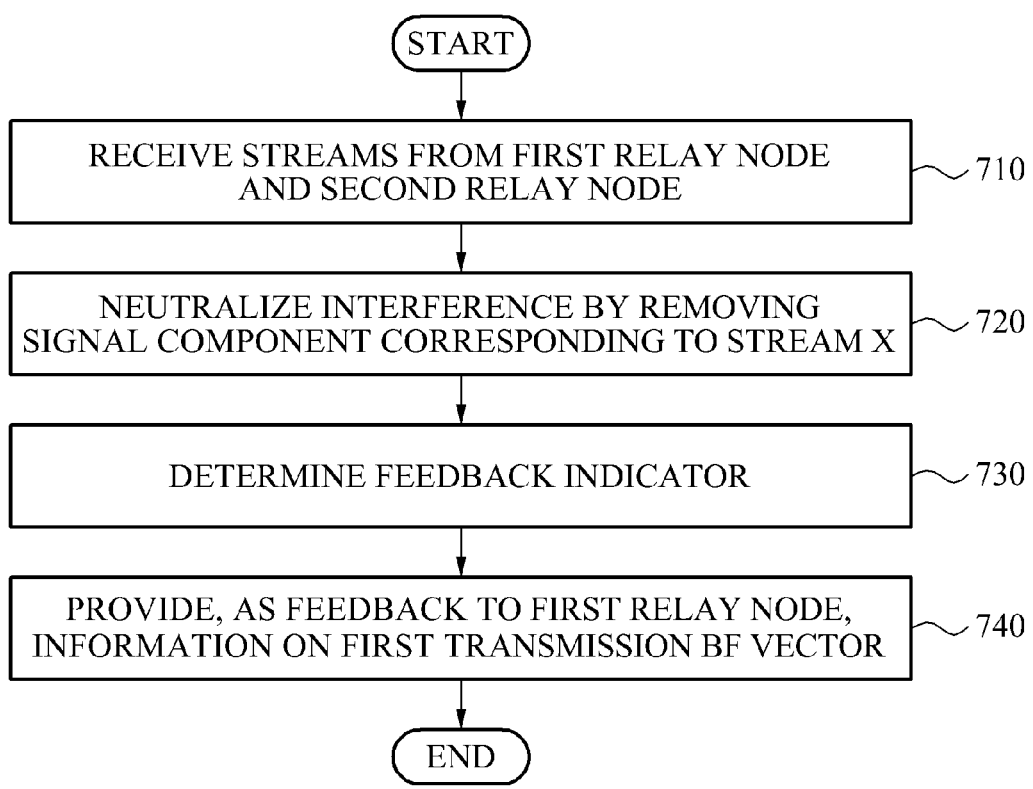
FIG. 7 is a flowchart illustrating an example of a communication method in a first destination node.

FIG. 7 illustrates an example of a communication method in a first destination node in a network including a first source node, a first relay node, the first destination node, a second source node, a second relay node, and a second destination node. In operation 710, the first destination node receives streams, aligned in a predetermined space, from the first relay node and the second relay node. The streams received by the first destination node include a stream X transmitted by the first relay node, a first signal in which streams Y and Z are aligned, and a second signal in which streams X and Z are aligned. The first signal is transmitted by the first relay node, and the second signal is transmitted by the second relay node. The first signal and the second signal may include, for example, a signal 'Y+Z' and a signal 'X+Z', respectively. A direction of a second transmission BF vector used to transmit the first signal is opposite to a direction of a third transmission BF vector used to transmit the second signal.

In operation 720, the first destination node neutralizes an interference by removing a signal component corresponding to the stream X transmitted by the first relay node among the received streams. For example, the first destination node adjusts a size of each of the first signal and the second signal based on a signal strength ratio of streams included in each of the first signal and the second signal, to neutralize the interference. That is, the first destination node neutralizes aligned interference components in the relay nodes to remove the interference.

In operation 730, the first destination node determines a feedback indicator based on information associated with a communication environment. The feedback indicator indicates which one of the first destination node and the second destination node provides, as feedback to a relay node, information on a transmission BF vector. The information associated with the communication environment may include a communication topology, a channel communication status, a fairness for each user, and/or any other information associated with the communication environment known to one of ordinary skill in the art.

In operation 740, the first destination node provides, as feedback to the first relay node, information on a first transmission BF vector based on the feedback indicator. The first transmission BF vector is used by the first relay node to transmit the stream X.

Figure 8:
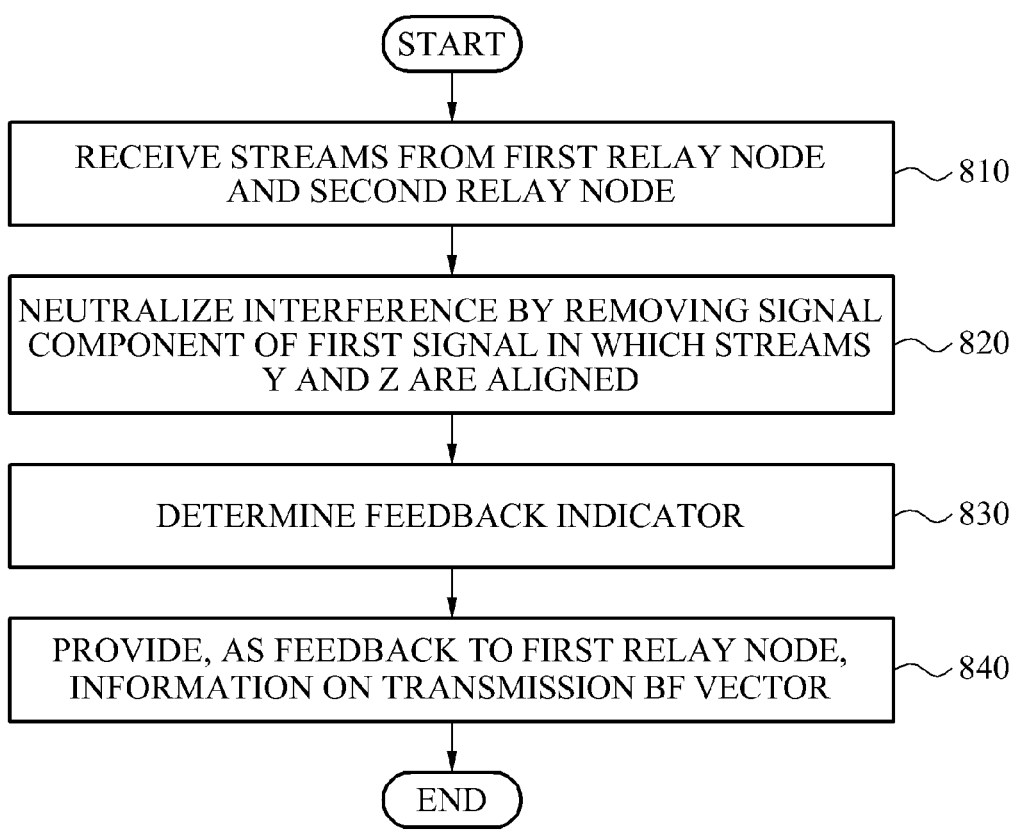
FIG. 8 is a flowchart illustrating an example of a communication method in a second destination node.

FIG. 8 illustrates an example of a communication method in a second destination node in a network including a first source node, a first relay node, a first destination node, a second source node, a second relay node, and the second destination node. In operation 810, the second destination node receives streams, aligned in a predetermined space, from the first relay node and the second relay node. The streams include a stream X transmitted by the first relay node, a first signal in which streams Y and Z are aligned, and a second signal in which streams X and Z are aligned. The first signal is transmitted by the first relay node, and the second signal is transmitted by the second relay node. The first signal and the second signal may include, for example, a signal 'Y+Z' and a signal 'X+Z', respectively.

In operation 820, the second destination node neutralizes an interference by removing a signal component of the first signal in which the streams Y and Z are aligned. In operation 830, the second destination node determines a feedback indicator based on information associated with a communication environment. The feedback indicator indicates which one of the first destination node and the second destination node provides, as feedback to a relay node, information on a transmission BF vector.

In operation 840, the second destination node provides, as feedback to the first relay node, the information on the transmission BF vector (for example, the above-described second transmission BF vector), based on the feedback indicator. The second transmission BF vector is used by the first relay node to transmit the streams Y and Z.

Figure 9:
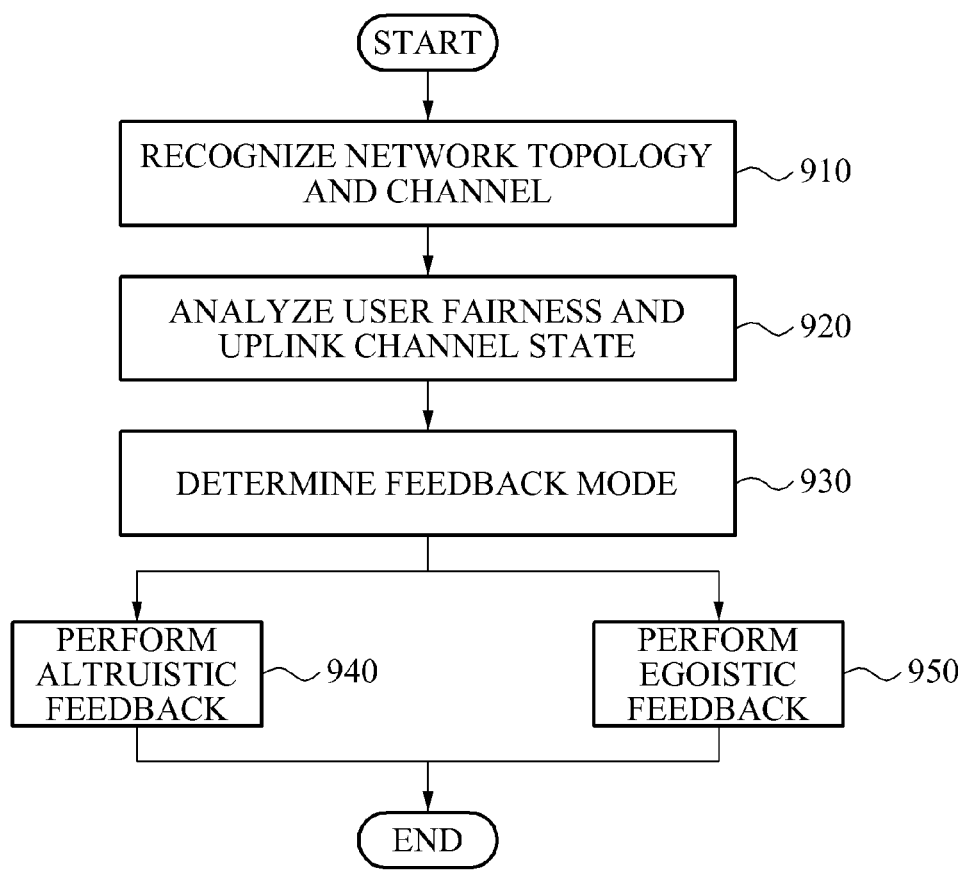
FIG. 9 is a flowchart illustrating an example of a method of determining a feedback indicator in a communication method in destination nodes for neutralization of aligned interferences in an interference channel.

FIG. 9 illustrates an example of a method of determining a feedback indicator in a communication method in destination nodes for neutralization of aligned interferences in an interference channel. In operation 910, a first destination node and a second destination node recognize a network topology and a channel. In operation 920, the first destination node and second destination node analyze a user fairness and an uplink channel state. In operation 930, the first destination node and second destination node determine a feedback mode based on information associated with a communication environment that is obtained in operations 910 and 920. In this example, a user requiring a feedback may be defined, or the feedback mode may be indicated, by an indicator, for example, a feedback indicator.

In operation 940, if a first transmission BF vector is required to be transmitted from the second destination node to a first relay node based on the feedback mode and/or the feedback indicator, the first destination node and second destination node perform an altruistic feedback. In operation 950, if a second transmission BF vector is required to be transmitted from the first destination node to the first relay node based on the feedback mode and/or the feedback indicator, the first destination node and second destination node perform an egoistic feedback.

Figure 10:
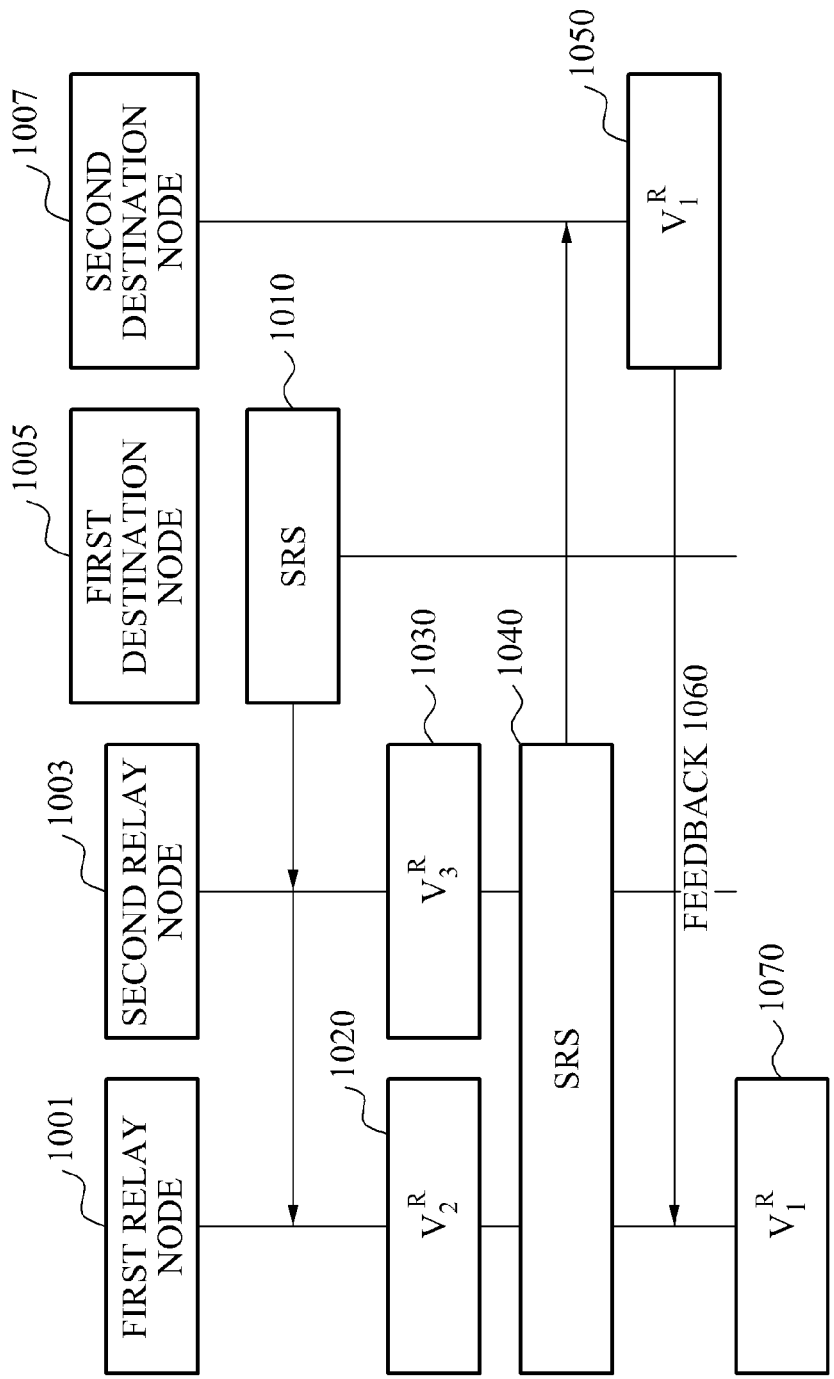
FIG. 10 is a flowchart illustrating an example of a method of performing an altruistic feedback in a communication method in a second destination node for neutralization of aligned interferences in an interference channel.

FIG. 10 illustrates an example of a method of performing an altruistic feedback in a communication method in a second destination node for neutralization of aligned interferences in an interference channel. As described above with reference to FIG. 3, interference neutralization is performed in the aligned space in the phase 2.

In operation 1010, a first destination node 1005 transmits an SRS to each of a first relay node 1001 and a second relay node 1003. In operation 1020, the first relay node 1001 receives, from the first destination node 1005, a transmission BF vector $V_2^R$ based on the SRS, and. in operation 1030, the second relay node 1003 receives, from the first destination node 1005, a transmission BF vector $V_3^R$ based on the SRS, without a separate channel feedback.

In operation 1040, each of the first relay node 1001 and the second relay node 1003 transmits, to a second destination node 1007, the SRS. In operation 1050, the second destination node 1007 determines a transmission BF vector $V_1^R$ for the first relay node 1001 based on the SRS, e.g., the transmission BF vector $V_3^R$ included in the SRS. In operation 1060, the second destination node 1007 provides, to the first relay node 1001, the transmission BF vector $V_1^R$ as feedback. In operation 1070, the first relay node 1001 receives, from the second destination node 1007, the transmission BF vector $V_1^R$.

Figure 11:
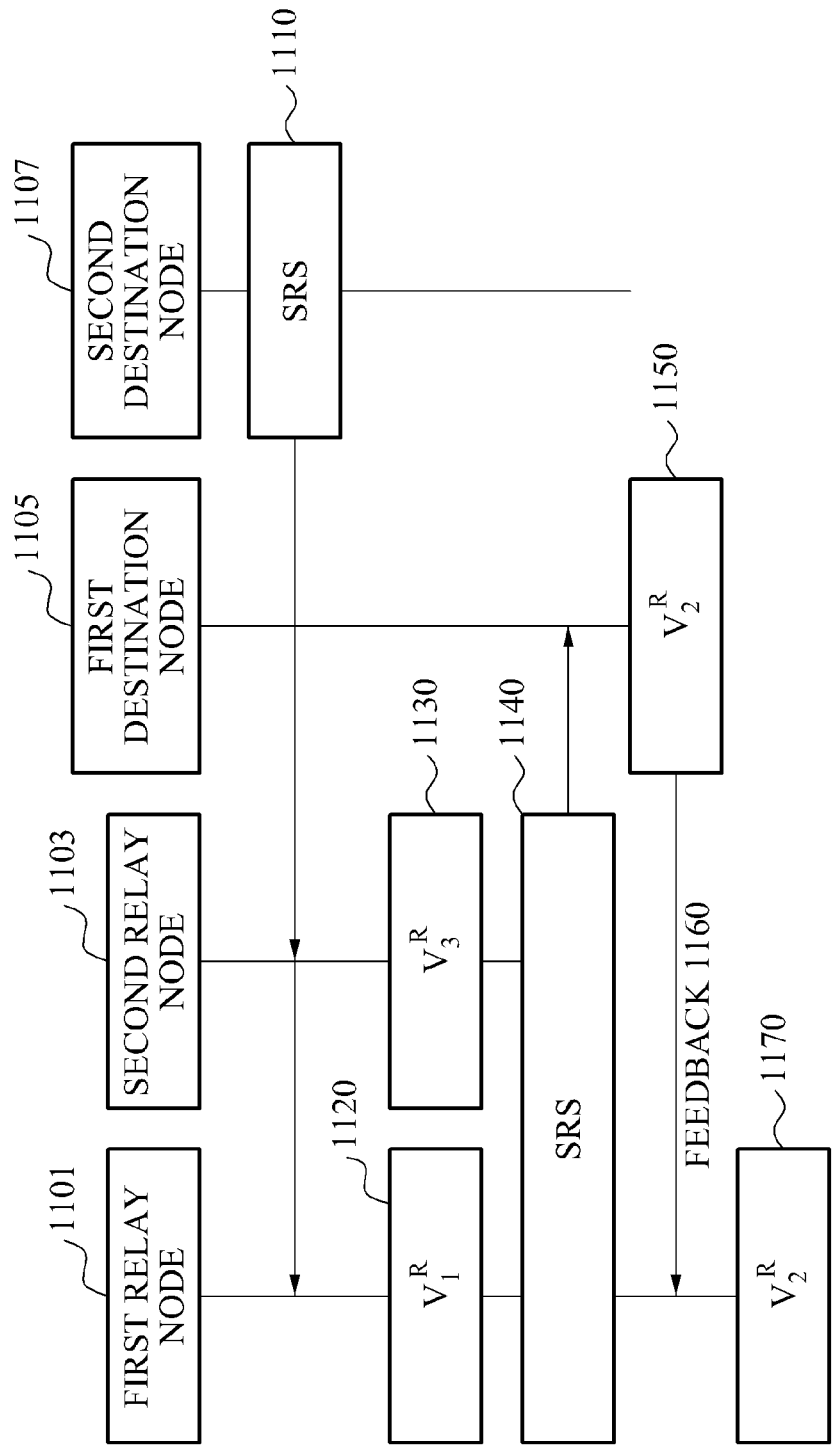
FIG. 11 is a flowchart illustrating an example of a method of performing an egoistic feedback in a communication method in a first destination node for neutralization of aligned interferences in an interference channel.

FIG. 11 illustrates an example of a method of performing an egoistic feedback in a communication method in a first destination node for neutralization of aligned interferences in an interference channel. A second destination node 1107 defines a pre-aligned space, or an aligned vector space. In operation 1110, the second destination node 1107 transmits, to each of a first relay node 1101 and a second relay node 1103, an SRS. In operation 1120, the first relay node 1101 receives, from the second destination node 1107, a transmission BF vector $V_1^R$ based on the SRS, and in operation 1130, the second relay node receives, from the second destination node 1107, a transmission BF vector $V_3^R$ based on the SRS, without a separate channel feedback.

In operation 1140, each the first relay node 1101 and the second relay node 1103 transmits, to a first destination node 1105, the SRS. In operation 1150, the first destination node 1105 determines a transmission BF vector $V_2^R$ for the first relay node 1101 based on the SRS, e.g., the transmission BF vector $V_1^R$ and the transmission BF vector $V_3^R$. In operation 1160, the first destination node 1105 provides, to the first relay node 1101, the transmission BF vector $V_2^R$ as feedback. In operation 1170, the first relay node 1101 receives, from the first destination node 1105, the transmission BF vector $V_2^R$.

According to the teachings above, there is provided a communication method in relay nodes and destination nodes for neutralization of aligned interferences in an interference channel, which reduces a channel feedback between source nodes and the relay nodes, by using channel reciprocity based on information on an aligned space shared by the source nodes. Additionally, the method reduces a cooperation overhead by determining a feedback mode and a user performing a feedback based on a communication environment, such as, for example, an uplink channel environment, a fairness for each user, and/or any other factors known to one of ordinary skill in the art.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of non-transitory computer-readable storage media include magnetic media, such as hard disks, floppy disks, and magnetic tape; optical media such as CD ROM disks and DVDs; magneto-optical media, such as optical disks; and hardware devices that are configured to store and perform program instructions, such as read-only memory (ROM), random access memory (RAM), flash memory, and the like. Examples of program instructions include machine code, such as produced by a compiler, and files including higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments accomplishing the example examples disclosed herein can be easily construed by programmers skilled in the art to which the examples pertain based on and using the flow diagrams and block diagrams of the figures and their corresponding descriptions as provided herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of a second relay node (R2) in a network comprising a first source node (S1), a first relay node (R1), a first destination node (D1), a second source node (S2), the second relay node (R2), and a second destination node (D2), the communication method comprising:

receiving, at the second relay node (R2), streams X and Y from the first source node (S1);

receiving, at the second relay node (R2), a stream Z from the second source node (S2);

generating an aligned signal (X+Z) at the second relay node (R2) in which the streams X and Z are aligned in a predetermined space based on a reception beamforming vector, the reception beamforming vector being orthogonal to a channel direction in which the second relay node (R2) receives the stream Y; and transmitting the aligned signal (X+Z) from the second relay node (R2) to the first destination node (D1) and the second destination node (D2) so that the aligned signal (X+Z) is to be received by the first destination node (D1) in an opposite direction with respect to an aligned signal (Y+Z), which is generated and transmitted by the first relay node (R1).

2. The communication method of claim 1, wherein the generating of the aligned signal (X+Z) comprises:

generating the aligned signal (X+Z) based on an indicator indicating the predetermined space, the indicator being in a predetermined codebook.

3. The communication method of claim 1, further comprising:

determining a transmission beamforming (BF) vector of the first source node (S1) based on a vector indicating the predetermined space, the transmission BF vector being used to transmit the stream X.

4. The communication method of claim 1, further comprising:

determining a transmission BF vector of the second source node (S2) based on a vector indicating the predetermined space, the transmission BF vector being used to transmit the stream Z.

5. The communication method of claim 1, the transmitting comprises:

transmitting the aligned signal (X+Z) to the second destination node (D2), so that the aligned signal (X+Z) is to be received by the second destination node (D2) in an opposite direction with respect to stream X transmitted by the first relay node (R1).

6. The communication method of claim 1, wherein the aligned signal (X+Z) and the stream X, which is transmitted from the first relay node (R1), are received in opposite directions by the second destination node (D2).

7. A non-transitory computer-readable storage medium storing program instructions controlling a processor to perform the method of claim 1.

8. A communication method of a first relay node (R1) in a network comprising a first source node (S1), the first relay node (R1), a first destination node (D1), a second source node (S2), a second relay node (R2), and a second destination node (D2), the communication method comprising:

receiving, at the first relay node (R1), streams X and Y from the first source node (S1);

receiving, at the first relay node (R1), stream Z from the second source node (S2), wherein the streams Z and Y are aligned in a predetermined space;

transmitting a signal comprising the stream X and an aligned signal (Y+Z) of the streams Z and Y to the first destination node (D1), so that the aligned signal (Y+Z) is to be received by the first destination node (D1) in an opposite direction with respect to an aligned signal (X+Z), which is generated and transmitted by the second relay node (R2); and transmitting the signal to the second destination node (D2), so that the stream X is to be received by the second destination node (D2) in an opposite direction with respect to the aligned signal (X+Z).

9. A communication method of a first destination node (D1) in a network comprising a first source node (S1), a first relay node (R1), the first destination node (D1), a second source node (S2), a second relay node (R2), and a second destination node (D2), the communication method comprising:

receiving, at the first destination node (D1), an aligned signal (X+Z) from the second relay node (R2), wherein streams X and Z are aligned in the aligned signal (X+Z);

receiving, at the first destination node (D1), the stream X and an aligned signal (Y+Z) from the first relay node (R1) in which the streams Y and Z are aligned; and removing the stream Z at the first destination node (D1) to neutralize an interference, wherein the aligned signal (X+Z) and the aligned signal (Y+Z) are received in opposite directions, and wherein the stream X and the stream Z are aligned, by the second relay node (R2), in a predetermined space based on a reception beamforming vector, the reception beamforming vector being orthogonal to a channel direction in which the second relay node (R2) receives the stream Y from the first source node (S1).

10. The communication method of claim 9, wherein the removing comprises:

adjusting a size of each of the aligned signal (X+Z) and the aligned signal (Y+Z) based on a signal strength ratio of streams included in each of the aligned signal (X+Z) and the aligned signal (Y+Z) to neutralize the interference.

11. The communication method of claim 9, further comprising:

determining a feedback indicator based on information associated with a communication environment, the feedback indicator indicating which one of the first destination node (D1) and the second destination node (D2) provides, as a feedback to the first relay node (R1), information on a transmission BF vector.

12. The communication method of claim 11, wherein the information associated with the communication environment comprises a communication topology, or a channel communication status, or a fairness for each user, or any combination thereof.

13. The communication method of claim 11, further comprising:

providing, as the feedback to the first relay node (R1), information on a third transmission BF vector based on the feedback indicator, the third transmission BF vector being used by the first relay node (R1) to transmit the stream X.

14. The communication method of claim 11, further comprising:

providing, as the feedback to the first relay node (R1), information on the second transmission BF vector based on the feedback indicator, the second transmission BF vector being used by the first relay node (R1) to transmit the aligned signal (Y+Z).

15. A communication method of a second destination node (D2) in a network comprising a first source node (S1), a first relay node (R1), a first destination node (D1), a second source node (S2), a second relay node (R2), and the second destination node (D2), the communication method comprising:

receiving, at the second destination node (D2), an aligned signal (X+Z) from the second relay node (R2), wherein streams X and Z are aligned in the aligned signal (X+Z);

receiving, at the second destination node (D2), the stream X and an aligned signal (Y+Z) from the first relay node (R1), wherein the streams Y and Z are aligned in the aligned signal (Y+Z); and removing the stream X at the second destination node (D2) to neutralize an interference, wherein the stream X and the aligned signal (X+Z) are received in opposite directions, and wherein the stream X and the stream Z are aligned, by the second relay node (R2), in a predetermined space based on a reception beamforming vector, the reception beamforming vector being orthogonal to a channel direction in which the second relay node (R2) receives the stream Y from the first source node (S1).

16. The communication method of claim 15, wherein the removing comprises:

adjusting a size of each of the stream X and the aligned signal (X+Z) based on a signal strength ratio of streams included in each of the stream X and the aligned signal (X+Z) to neutralize the interference.

17. The communication method of claim 15, further comprising:

determining a feedback indicator based on information associated with a communication environment, the feedback indicator indicating which one of the first destination node (D1) and the second destination node (D2) provides, as a feedback to the first relay node (R1), information on a transmission beamforming (BF) vector.

18. The communication method of claim 17, further comprising:

providing, as the feedback to the first relay node (R1), information on the first transmission BF vector based on the feedback indicator, the first transmission BF vector being used by the first relay node (R1) to transmit the stream X.

19. The communication method of claim 17, further comprising:

providing, as the feedback to the first relay node (R1), information on a third transmission BF vector based on the feedback indicator, the third transmission BF vector being used by the first relay node (R1) to transmit the aligned signal (Y+Z).

* * * * *